Figure 5:
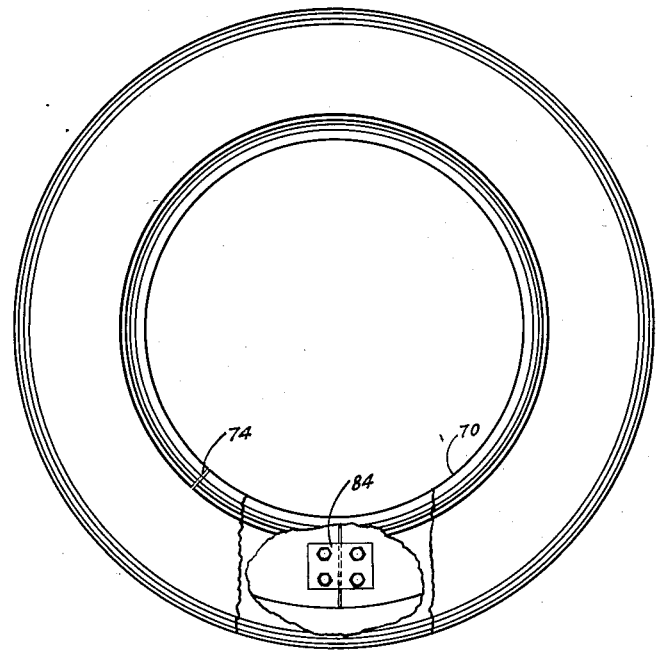

May 12, 1936.　　F. S. DICKINSON　　2,040,645
NONCOLLAPSIBLE TIRE
Filed July 27, 1934　　2 Sheets-Sheet 1
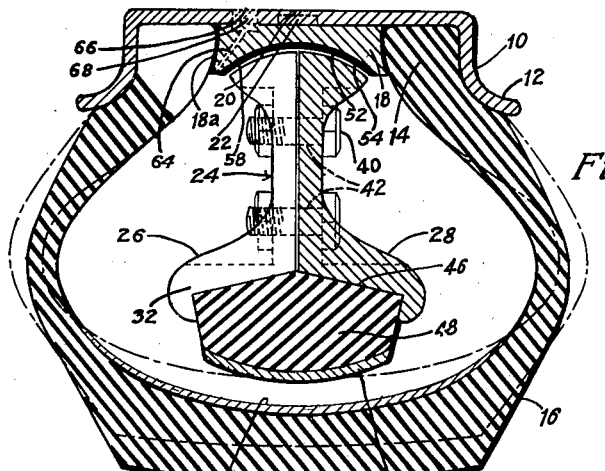
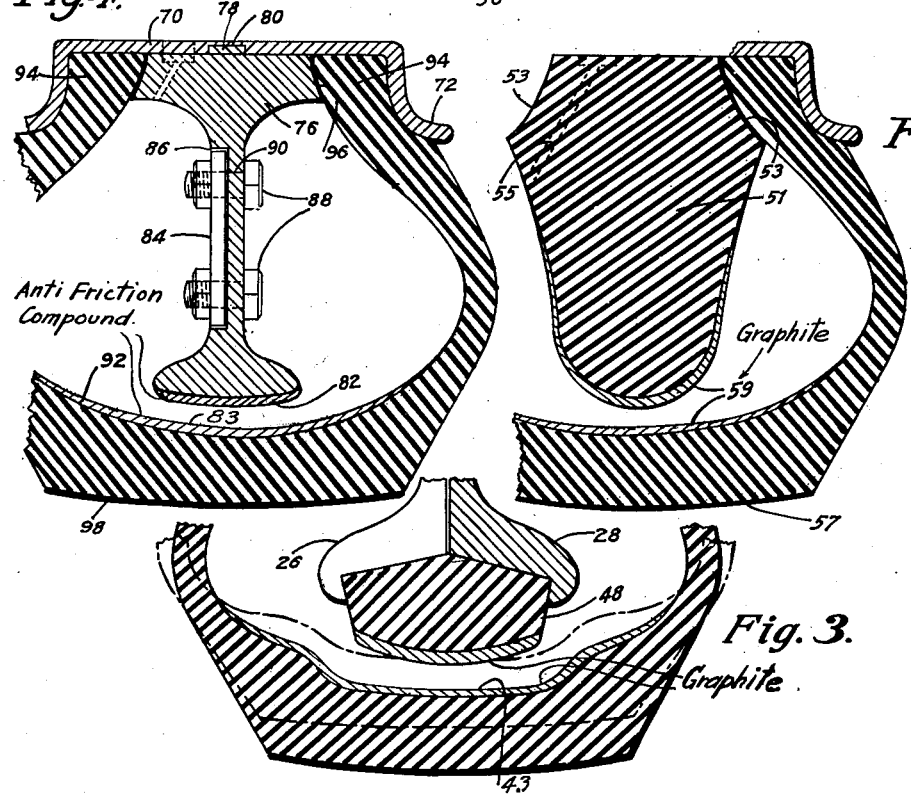
Fredrick S. Dickinson
INVENTOR.
BY *Hammond*
ATTORNEYS.

May 12, 1936.  F. S. DICKINSON  2,040,645
NONCOLLAPSIBLE TIRE
Filed July 27, 1934  2 Sheets-Sheet 2

Fredrick S. Dickinson
INVENTOR.

BY
ATTORNEYS.

Patented May 12, 1936

2,040,645

UNITED STATES PATENT OFFICE 2,040,645

NONCOLLAPSIBLE TIRE

Fredrick S. Dickinson, New York, N. Y.

Application July 27, 1934, Serial No. 737,195

13 Claims. (Cl. 152—10)

The pneumatic tire and safety device therefor comprising the present invention is adapted for use with all manner of vehicles that depend for their tractional support and riding comfort upon pneumatic cushioning means.

The principal object of the invention is to provide a tire which is designed to be inflated and which in the event of deflation from punctures, blow-outs, or for any other reason may still be used without injury to the tire itself or to the rim or felly upon which it is mounted. The safety device further affords protection against under-inflation of the tire and against overloading, thus eliminating localized flexing of the tire at the sides thereof and consequent damage due to weakening of the bond that holds the various plies of the tire together or breakage of the ply material at the side wall thereof.

The dangers attendant upon sudden deflation of a tire are well known. In the case of buses, trucks and other vehicles employing tires of large diameter, these dangers are accentuated. Because of the relative difference in wheel diameter when sudden collapse of a tire occurs, there is a tendency for the vehicle to pivot on the deflated tire before the vehicle can be brought to a stop. This is especially true in the case of deflation of a front tire. The present invention contemplates the provision of a tire which in the event of sudden deflation does not materially reduce the outside diameter of the wheel and tire assembly thus averting the series danger of pivoting.

Heretofore numerous devices have been designed for preventing complete collapse of the tire in the event of deflation or overloading. Many of these consist of an annular rib or flange which is secured to the rim of the wheel upon which the tire is mounted and projects inwardly of the tire to afford a circumferential clearance between the rib and the inner surface of the tire tread when the tire is inflated. It is to this class of safety device that the present invention pertains.

Such prior art devices, while they may prevent complete collapse of the tire, fail to preserve the same for any prolonged period of time under conditions of deflation or overloading, because no provision is made for the elimination of destructive friction between the contacting surfaces of the rib and the inner side of the tire tread when the tire is run under conditions of deflation. Because of the difference in circumferential length between the inner side of the tread and the outer contacting periphery of the rib, both of these areas, depending for their relative fixed concentric positions upon their attachment to the rim of the wheel, must necessarily slip upon each other at each revolution of the wheel, a distance equal to the difference in their respective circumferences. Because of the relatively high coefficient of friction of rubber, regardless of the material with which it is in contact, such slippage considering the weight of the vehicle, is highly destructive to the tire.

The present invention is designed to eliminate friction, between the inner surface of the tire and the periphery of the sustaining rib, and in a modification thereof permits slippage, but reduces the attendant friction to a minimum so that there will be no deleterious effect upon the tire.

The provision of a wheel and tire assembly which dispenses with the use of the conventional inner tube yet which at the same time is rugged and durable is a further desirable feature that has been borne in mind in the production and development of the present invention.

Figure 2:
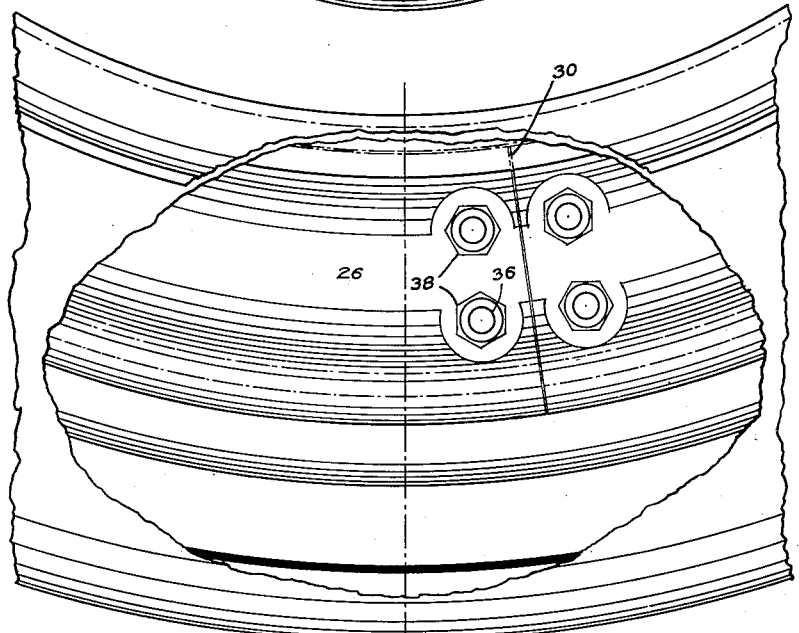

Other objects and advantages of the invention will become apparent as the nature of the same is better understood. In the embodiment illustrated in the accompanying drawings;

Figure 1 is a radial sectional view of a tire and rim assembly, together with the safety device therefor manufactured in accordance with the principles of this invention and designed for use in connection with heavy vehicles, such as buses, trucks, trains and the like, Figure 2 is a fragmentary side elevation of the assembly, illustrated in Figure 1, a portion of the tire casing being broken away to reveal the internal safety device, Figure 3 is a fragmentary radial sectional view similar to Figure 1 showing a modified form of tire casing associated with the safety device, Figure 4 is a radial sectional view similar to Figure 1, showing a further modified form of the safety device, Figure 5 is a side elevation of a tire and rim assembly showing the safety device of Figure 4 applied thereto. In this view a portion of the tire casing is broken away, to more clearly reveal the nature of the invention, and Figure 6 is a radial sectional view of a modified form of safety device designed for use in connection with light passenger vehicles.

Like characters of reference are employed to designate like parts in the drawings.

Referring now to Figures 1 and 2, a split tire rim is designated at 10. This rim is of conventional design and is provided with side flanges 12 for maintaining the beads 14 of a tire 16 in position on the rim in the usual manner. A bearing ring is shown at 18 which is sealed at 18a to the beads 14. This ring is preferably in the form of a complete circle which is passed over the contracted flanges 12 of the split rim 10 and into position centrally of the rim as shown.

The rim 10 is provided with an aperture 20 in the central portion thereof and the bearing ring 18 is provided with a lug 22 adapted to be received within the aperture 20 to lock the ring securely to the rim and prevent relative turning movement between these parts.

The bearing ring 18 is provided with sides 19 adjacent its inner periphery which are curved slightly to accommodate the curvature of the tire beads 14. The tire beads 14 fit closely against the flanges 12 and against the curved surfaces of the friction ring 18 and are sealed thereto in such a manner that air contained within the tire may not escape around the beads.

The safety device for preventing sudden collapse of the tire 16 in the event of deflation and for preventing flattening of the tire at its point of contact with the ground when overloaded, is designated in its entirety at 24. This device is in the form of a two-part, annular, centrally and outwardly projecting rib. This rib is split radially to provide two adjacent sections 26 and 28, which sections are substantially identical in form. The section 26 is split at 30 while the section 28 is split at 32 to permit these sections to be inserted separately into the tire casing 16 and to be expanded over the bearing ring 18, to be subsequently contracted into position on this ring as shown in Figure 1.

A plurality of aligned apertures 36 extend through both the sections 26 and 28 on opposite sides of the split 30 and the nut and bolt assemblies 38 are passed through these apertures to secure the free ends of the section 26 adjacent the split 30 to a solid portion of the section 28. Similar nut and bolt assemblies 40 extend through aligned apertures 42 in both parts 26 and 28 on opposite sides of the split 32 in the section 28 at points diametrically opposed to the assemblies 38. Thus the two sections 26 and 28 are firmly secured together to form an annular rib which in cross-section has approximately the contour of an I-beam.

Each of the sections 26 and 28 is provided with a beveled edge 46 which, when the sections are assembled, provides a comparatively wide dovetailed groove in which there is received a ring-like contact member 48. While this contact member 48 may be formed in any suitable manner and of any suitable material, it is preferable that it be formed of rubber or some other resilient composition.

When the tire 16 is inflated with the recommended amount of air pressure, the outer circumference of the resilient member 48 is spaced inwardly from the inner surface of the tread of the tire 16 a sufficient distance that the safety device 24 does not in any way interfere with the normal functioning of the pneumatic tire. In the event of collapse of the tire, the inner surface of the tread 50 is designed to come into contact with the resilient member 48. In order to prevent slippage of the resilient ring member 48 on the tire 16 and consequent destruction of the tire due to friction, distortion and abrasion, the assembly is rotatably mounted on the bearing ring 18. Toward this end the inner circumference of the rib 26, 28 is slightly greater than the outer circumference of the bearing ring 18. The ring member is provided with an inwardly extending annular curved trough 52 and the annular rib 24 formed by the sections 26 and 28 is curved at 54 and rides freely in the trough 52. By such an arrangement, the sections 26, 28, forming the rib are free to turn on the ring 18. In order to further such turning movement of the rib with respect to the ring member 18, the outer surface of the ring 52 has vulcanized thereon or otherwise permanently secured thereto a compound of anti-friction or self-lubricating materials, the base of which is preferably foliated or flake graphite 58. The outer surface of the resilient contact 48 is provided with a similar compound 60 which is vulcanized or otherwise secured thereto, and the inner surface of the tread has vulcanized or secured thereto a similar compound 62.

The ring member 18 has a duct 64 extending therethrough which communicates with a valve stem 66, threadedly received in an aperture 68 extending through the rim 10. The tire 16 may be inflated to the proper degree through this valve stem 66 and duct 64, and the seal between the beads of the tire and the ring 18 will be sufficient to hold air pressure. If desired the side walls of the ring 18 may have vulcanized thereon a soft rubber sealing material 18a. This rubber sealing material may also be cemented or cemented and vulcanized to the contacting surfaces of the beads 14.

Under normal conditions of travel, when the tire 16 is properly inflated, and when the load carried is not excessive, the inner surface of the tire tread will be maintained, by virtue of the air pressure within the tire, out of contact with the contact member 48. Should the tire become deflated due to a puncture, blow-out, or for any other reason, or should the vehicle supported by the tire be overloaded, the tread 50 will be depressed so as to contact with the contact member 48. The weight of the vehicle will then be transmitted through the rim 10, bearing ring 18, rib 26, 28 and contact member 48 to the tread 50. The contact member 48 and the inner part of the tread 50 both being formed of rubber will present to each other a relatively high coefficient of friction. Because of the difference in circumferential length between the inner side of the tread 50 and the outer contacting periphery of the contact member 48, and because both of these areas depend for their relatively fixed concentric positions upon the attachment to the rim 10, or bearing member 18, the entire rib assembly will move with the tread 50 and will turn on the ring 18 at a rate of turning that is sufficient to compensate for the difference in circumference between the tread 50 and the contact member 48. In other words, slippage will occur between the rib 24 and the ring 18 rather than between the contact member 48 and the tread 50 because the coefficient of friction between the ring 18 and rib 24 is materially less than the coefficient friction between the two rubber surfaces regardless of the lubricant applied thereto. Since there will be no slippage between these two latter members the tire may be run in its deflated condition without damage thereto. When the tire is run in such a deflated condition a limited amount of lateral slipping of the web assembly relative to the tread may occur when the vehicle supported by the tire encounters a curve in the road or other traction surface. There will be little or no damage to the tire however, by virtue of the anti-friction coating 62 provided on the inner side thereof and on the outer periphery of the contact member 48.

In Figure 4 a modified form of safety device is disclosed, in this form of the invention the device is adapted for use on railway cars. In railway car use where the tire is adapted to travel upon a rail, a depending flange is provided for the purpose of avoiding derailment. The device shown in Figure 4 is adapted to prevent collapse of the tire to such an extent that the depending flange would come into contact with the fish plates, nuts, bolts, or other projections on the rail. The rim is designated at 70 and is provided with tire bead flanges 72. The rim may be split as at 74 to permit the same to become contracted and the flanges 72 withdrawn so that the entire rim in its contracted condition may be passed through the central aperture in a ring like rib member 76 and thereafter expanded into position on this rib member. The rib member 76 is formed of an inflexible non-compressible material such as metal.

The inner periphery of the rib member 76 is provided with a lug 78 which extends into an aperture 80 provided centrally at one point on the circumference of the rim 70. Thus the rib 76 is prevented from turning with respect to the rim on which it is mounted. The rib 76 is in the form of a split ring having an annular enlarged outer bearing surface 82. The rib 76 may be spread by virtue of the split to facilitate insertion of the rib 76 into the tire. The ends of the rib 76 are adapted to be secured together in abutting relationship by means of a plate 84 which is received within a recess 86 provided at the ends of the rib. Nut and bolt assemblies 88 extend through apertures 90, provided adjacent and on opposite sides of the split portion of the same. Thus when the plate 84 is in position the rib 76 is in the form of a solid ring firmly secured against rotation on the rim 70. A tire 92 has its beads 94 wedged between curved side surfaces 96 formed on the inner portion of the rib 76, and the flanges 72, so as to exclude the passage of air around these beads. The outer enlarged portion 82 of the rib 76 is covered with an anti-friction compound which may be permanently vulcanized or otherwise secured thereto, a similar compound 83 being vulcanized or secured to the inner contacting surface of the tire.

The tire 92 is provided with a tread 98 which, when the tire is inflated, is slightly spaced circumferentially from the bearing portion 82. In the event of deflation of the tire or overloading of the vehicle the tread 98 is designed to come into contact with the bearing portion 82 inside its point of traction on the ground. Because of the difference in circumferential length between the tread and the enlarged bearing portion 82 and because both of these portions depend for their relative concentric fixed positions upon their attachment to the rim 70, there will be slippage of these portions upon each other at each revolution of the wheel. The deleterious effect of such slippage, however, will be reduced to a minimum by virtue of the reduction of friction between these parts through the use of anti-friction bearing materials, thereby preventing abrasion and destructive strains and heating in the tire walls.

In Figure 3, a modified form of tire casing is shown. The sectional rib 26, 28 together with the contact member 48 remain substantially the same as in the form of the invention shown in Figure 1. The tire tread is shown at 41. The inner surface of the tread is provided with an annular trough 43 which is slightly wider than the width of the contact member 48. The bottom and sides of the trough have compounded therein by vulcanization or the like an anti-friction material such as graphite. When the contact member 48 contacts with the inner side of the tire, slippage of the member 48 on the inner surface of the tire 41 circumferentially is averted by virtue of the anti-friction bearing 52, 54 (Figure 1). Slippage due to side sway of the vehicle, as in the case of the vehicle encountering a turn or on a crowned road is prevented inasmuch as the contact member 48 is maintained in the trough 43 by virtue of the relatively great weight of the vehicle.

In Figure 6, the safety device is in the form of a unitary, ring-like solid rib 51 of resilient material and having curved tire bead sealing surfaces 53. A duct 55 for the admission of air to the interior of the tire extends through this rib for communication with a valve stem. The outer periphery of this rib has compounded therein by vulcanization or the like a suitable anti-friction compound such as a graphite and the inner surface of the tire tread 57 may have a coating of this material vulcanized thereto as at 59. In this form of the invention, a more resilient support simulating normal conditions under full tire inflation is obtained even when the tire is completely deflated or heavily overloaded.

The invention is not to be limited to the exact arrangement of parts shown in the accompanying drawings or described in this specification as various changes in the details of construction may be resorted to without departing from the spirit of the invention. Only insofar as the invention has particularly been pointed out in the accompanying claims is the same to be limited.

I claim:

1. The combination with a rim and a pneumatic tire therefor, of a bearing ring on said rim, said ring having a bearing surface thereon, an annular rib revolvably supported with respect to said ring, said rib having a bearing surface thereon in contact with said first mentioned bearing surface, said rib extending into said tire toward the outer periphery thereof.

2. The combination with a rim and a pneumatic tire therefor, of a bearing ring on said rim, an annular rib rotatably supported on said ring and extending into said tire toward the periphery thereof, and cushioning means on the outer circumference of said rib adapted to engage the inner surface of the tire periphery upon deflation of said tire.

3. The combination with a rim and a pneumatic tire therefor, of an annular rib rotatably supported on said rim and extending into said tire toward the tread thereof, said rib being adapted to engage the inner periphery of the tire upon deflation of said tire, said rib being free to rotate in substantial synchrony with the inner surface of the deflated tire to prevent abrasion thereof.

4. The combination with a rim and a pneumatic tire therefor, of an annular rib rotatably supported on said rim and extending into said tire toward the tread thereof, and cushioning means on the outer circumference of said rib adapted to engage the tread upon deflation of said tire, said rib having a substantially frictionless differential rotation with respect to the rim.

5. The combination with a rim and a pneumatic tire therefor, of an annular rib rotatably supported on said rim and extending into the tire toward the periphery thereof, the inner surface of said tire at the periphery thereof having an anti-friction compound, and a rubber binder integrally formed as a part of the tire, and the outer periphery of said rib having an anti-friction compound and binder integrally formed as a part thereof.

6. The combination with a rim and a tire therefor, of an annular rib rotatably mounted on said rim and projecting into the tire toward the periphery thereof and adapted to engage the inner surface of the tire periphery upon deflation of said tire, said inner surface of the tire periphery being made of a graphite compound in a rubber binder.

7. The combination with a rim and a tire therefor, of an annular rib mounted on said rim centrally thereof and adapted to engage the inner surface of the tire periphery upon deflation of said tire and projecting into said tire toward the periphery thereof, the outer circumference of said rib having a graphite compound integrally formed in the contact portion.

8. The combination with a rim and a tire therefor, of an annular rib mounted on said rim centrally thereof and projecting into said tire toward the periphery thereof and adapted to engage the inner surface of the tire periphery upon deflation of said tire, the inner surface of said tire adjacent the periphery thereof and the outer periphery of said outer rib having a graphite compound compounded therein.

9. The combination with a rim and a tire therefor, of an annular rib mounted on said rim and projecting into said tire toward the tread thereof and adapted to remain spaced from said tread when said tire is inflated but adapted to contact the inner surface thereof upon deflation of the tire, and means carried by one of the contacting surfaces for reducing friction between said rib and the inner surface of said tread upon contact of the same.

10. The combination with a rim and a tire therefor, of a resilient annular rib mounted on said rim centrally thereof and projecting into said tire toward the periphery thereof, said rib being normally spaced from said tread when the tire is inflated, but being adapted to contact with the inner surface thereof upon deflation of the tire, said rib having a graphite lubricating element compounded in the outer surface thereof.

11. The combination with a rim and a pneumatic tire therefor, of a pair of ring-like members supported centrally on said rim, there being an annular recess in the outer circumference of each member, a cushioning element disposed in said recesses, means for clamping said members together and for maintaining said cushioning member in said recesses, and an anti-friction connection between said members and the rim for permitting circumferential turning movement of the members with respect to the rim.

12. In a rim and tire assembly, an annular rib centrally supported on said rim and extending into the tire toward and short of the periphery thereof, the outer periphery of said rib being adapted to engage the inner surface of said tire when the latter is deflated, there being an internal annular trough in said tire in which said rib is adapted to ride when the tire is deflated, and means for reducing friction between said rib and trough upon contact of the same.

13. In a rim and tire assembly, an annular rib centrally supported on said rim and extending into the tire toward the periphery thereof, and the outer periphery of said rib being adapted to engage the inner surface of said tire when the latter is deflated, there being an internal annular trough in said tire in which said rib is adapted to ride when the tire is deflated, and a graphite lubricant in said trough.

FREDRICK S. DICKINSON.